United States Patent [19]

Bové

[11] 4,400,906
[45] Aug. 30, 1983

[54] HOUSE CONSTRUCTION SET

[75] Inventor: Fred Bové, Luxembourg, Luxembourg

[73] Assignee: Plaserco S.A., la Foire, Luxembourg

[21] Appl. No.: 92,580

[22] Filed: Nov. 8, 1979

[30] Foreign Application Priority Data

Nov. 17, 1978 [FR] France ............................. 78 32546

[51] Int. Cl.³ .......................................... A63H 33/16
[52] U.S. Cl. ............................................. 46/21; 46/31
[58] Field of Search ............... 46/21, 19, 31, 26, 25, 46/30, 20, 12, 16; 35/16; 52/DIG. 6, 585, 586

[56] References Cited

U.S. PATENT DOCUMENTS

| | | | |
|---|---|---|---|
| 2,204,319 | 6/1940 | Parsons et al. | 46/19 |
| 3,162,973 | 12/1964 | Christiansen | 46/25 |
| 3,603,025 | 9/1971 | Heubl | 46/25 |
| 3,987,579 | 10/1976 | Palenik | 46/31 X |
| 4,030,236 | 6/1977 | Schnabel | 46/25 |

FOREIGN PATENT DOCUMENTS

| | | | |
|---|---|---|---|
| 1148799 | 12/1957 | France | 46/26 |
| 890608 | 3/1962 | United Kingdom | 46/26 |
| 1212537 | 11/1970 | United Kingdom | 46/25 |

Primary Examiner—Mickey Yu
Attorney, Agent, or Firm—Holman & Stern

[57] ABSTRACT

A construction set having a floor, rectangular outer wall and inner partition modules, the surface of the floor and one edge of the modules having an identical jointing structure formed by mortises, or tenons, aligned in two directions parallel to the edges of the floor, and adaptation elements having on two of their opposite faces a jointing structure complementary of that of the floor and of the modules, formed by tenons, or mortises. The set offers numerous possibilities of construction.

21 Claims, 13 Drawing Figures

HOUSE CONSTRUCTION SET

BRIEF SUMMARY OF THE INVENTION

The present invention relates to a construction set for constructing, on a reduced scale, houses, buildings and generally any real estate units, whether dwellings or professional premises.

The problem from which the present invention originates is in fact a double one.

Applicant has firstly sought to design an educational toy enabling children to become familiarised with architectural concepts, so as to reveal their own personality to themselves. The difficulties of modern life are well known and the habitat is probably one field in which an individual's personality can, today, most easily be expressed.

Applicant has also sought to enable adults, whether they be private individuals or professionals, to make the model of the house or premises of their choice, respecting the proportions and arrangement of the different volumes. It is well known that numerous private individuals are having their main or secondary residence constructed, and the present invention is precisely intended to offer them to means which, either for themselves or for their architect or contractor, translate their ideas and hopes as best possible, before construction is finally begun.

Consequently, apart from the educational aspect mentioned above, the construction set of the present Application is also intended to be utilitarian, insofar as the acquirer of real estate may, with this toy, participate personally in the production of the plans or the interior arrangements more than heretofore and under better conditions.

The present invention therefore relates to a construction set, particularly for houses, comprising at least outer wall modules, inner partition modules and a floor, the floor comprising a mosaic jointing structure formed by identical mortises, or tenons, perpendicular to its surface, and aligned in two perpendicular directions at regular determined pitches, said set being characterized in that each of the modules is formed by a rectangular panel of which at least one edge comprises a jointing structure identical to that of the floor and adaptation elements are provided comprising on two of their opposite parallel longitudinal faces a jointing structure complementary of that of the floor and of the modules, formed by tenons, or mortises.

Due to the invention and with the set able to comprise modules of all sizes, it is particularly easy, especially for children, to construct the ideal house, taking any modules, firstly jointing them to corresponding adaptation elements by one of the faces of these elements, then positioning these elements, and therefore these modules, on the floor by the other face of these elements provided with the jointing structure, the adaptation elements preferably having the same length as the edges comprising the jointing structure of the modules with which they are jointed.

In a preferred embodiment of the construction set according to the invention, a rectangular floor is provided of which the mortises, or tenons, have transverse sections parallel to its surface which are inscribed in squares distributed on the surface of the floor in two series of squares whose diagonals are respectively parallel to the edges of the floor and aligned at a pitch equal to double the length of these diagonals, the squares of one of the two series of squares being offset with respect to those of the other series by half said pitch in the two directions parallel to the edges of the floor.

The set may then comprise wall modules whose width is equal to an odd number of half-pitches, preferably three, and partition modules whose width is equal to an even number of half-pitches, preferably two.

If the wall modules have a length equal to an even number of half pitches, the corresponding adaptation elements, preferably of the same width, are arranged so that each of their two jointing structures is the image of the other with respect to the longitudinal median plane of these elements.

One of these wall modules may then occupy on the floor two positions offset by a half-pitch parallel to one of the edges of the floor, the second being occupied after rotation of this module through 180°, and without having broken the joint with its associated adaptation element.

On the other hand, such an offset is not possible with wall modules whose length is equal to an odd number of half-pitches.

Consequently, adaptation elements are provided in the set of the invention, preferably always of the same width, arranged so that each of their two jointing structures is the image of the other with respect to the longitudinal median plane of these elements, but offset longitudinally by a half-pitch.

Thus, when such a module is positioned on the floor with the aid of an adaptation element with offset structures, it suffices, in order to offset the module by a half-pitch on the floor in a direction parallel to one of its edges, to replace the adaptation element with offset structures by another adaptation element, of the same length, but with non-offset structures. Inversely, when such a module of length equal to an odd number of half-pitches is positioned on the floor with the aid of an adaptation element with non-offset structures, it suffices, in order to offset this module by a half-pitch on the floor in a direction parallel to one of its edges, to replace the adaptation element with non-offset structures by another adaptation element, of the same length, but with offset structures.

In the present case, these are essential features of the construction set of the invention, which thus offers numerous possibilities of construction.

Concerning the adaptation elements of the partition modules, it is the opposite. There corresponds, to a partition module whose length is equal to an odd number of half-pitches, an adaptation element of the same width and having jointing structures which are not offset; and there correspond, to a partition module whose length is equal to an even number of half-pitch, two adaptation elements whose structures are respectively non-offset and offset longitudinally by a half-pitch.

BRIEF DESCRIPTION OF THE SEVERAL VIEWS OF THE DRAWINGS

The invention will be more readily understood on reading the following description with reference to the accompanying drawings, in which.

DETAILED DESCRIPTION

The construction set according to the invention, and of which the elements are shown in the accompanying drawings, essentially comprises a floor, outer wall modules, inner partition modules, and adaptation elements.

Figure 1:
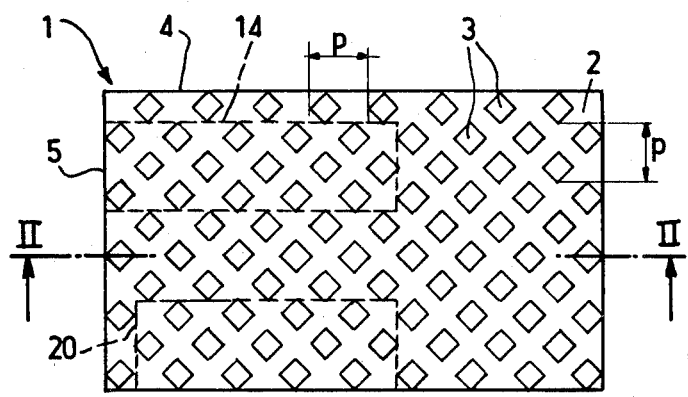
FIG. 1 is a plan view of a first embodiment of the floor of the construction set according to the invention.
Figure 2:
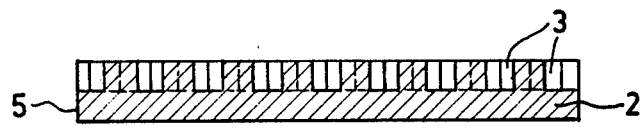
FIG. 2 shows a view in section along line II—II of FIG. 1.

Referring now to the drawings, the floor 1 of FIG. 1 is constituted by a rectangular base 2 in which are formed mortises 3. These mortises 3 may advantageously be obtained by molding or by calendering, if the floor is formed for example of plastics material. In the case of the floor not comprising mortises, but tenons, these tenons could be obtained in the same manner, or may be machined from a rough parallelepipedic base. The actual base 2 may be of any thickness. On the other hand, the dimensions of the mortises 3 and their distribution on the surface of the base 2 are determined precisely.

The floor 1, shown in FIG. 1, may, in itself, constitute the floor of a house. However, it may also constitute only one of the modular elements of a larger floor. In this respect, it may be joined to one or more other identical modules in the same way and with the same means as those which will be described concerning the positioning of the wall and partition modules on the floor.

The mortises 3, in the example shown, have a transverse section parallel to the surface of the base 2 which is inscribed in a square whose two diagonals, of given length, are respectively parallel to the edges 4 and 5 of the base 2. In the present case, the mortises 3 are shaped as these squares, with a determined depth. They could, moreover, also pass through the whole thickness of the base. The squares in question are regularly distributed on the surface of the base 2 in two series of squares whose diagonals are respectively aligned at a pitch p equal to double the length of these diagonals, the squares of one of the two series of squares being offset with respect to those of the other series by half the pitch p in the two directions parallel to the two edges of the base 2.

The outer wall and inner partition modules, of which there is a sufficient number in the construction set of the invention, are constituted by panels of rectangular shape, of various heights and lengths, so that there is a variety of modules, such as modules whose height corresponds to that of the rooms, breast-wall modules, lintel modules, etc.

Figure 3:
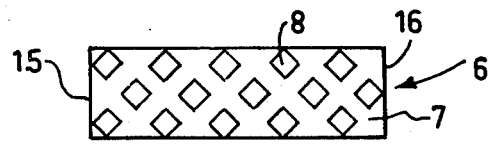
FIG. 3 shows a view from underneath of a first embodiment of a wall module of the construction set according to the invention.

The module 6, shown in FIG. 3 in a view from underneath, is a wall module. Its width is equal to an odd number of half-pitches, three in the present case, and its length to an even number of half-pitches, ten in the present case. The lower face 7 of the module 6 comprises a structure identical to that of the base 2, in the present case mortises 8 identical to the mortises 3 of the base 2, disposed on its surface and aligned with respect to its edges in the same manner as the mortises 3 are disposed on the surface of base 2.

Figure 4:
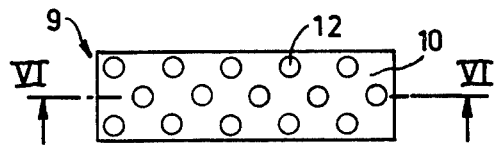
FIG. 4 shows a plan view of the adaptation element corresponding to the module of FIG. 3.
Figure 5:
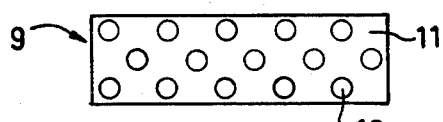
FIG. 5 shows a view from underneath of the adaptation element of FIG. 4.
Figure 6:
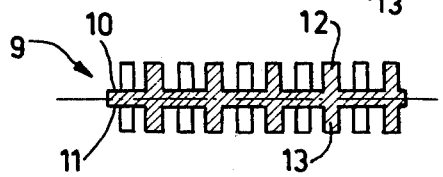
FIG. 6 shows a view in section along line VI—VI of FIG. 4.

To position the module 6 on the base 2, an adaptation element 9 is provided, shown in FIGS. 4 to 6. This element 9 has the same width and the same length as module 6.

However, the invention is not limited to adaptation elements of the same lengths as the modules. These elements could also be shorter or longer.

The element 9 comprises, on its two upper and lower faces 10 and 11 respectively, two structures complementary of that of base 2 and of module 6 in order to cooperate therewith. Thus, the two faces 10 and 11 are provided with a mosaic of tenons 12 and 13, of height equal to the depth of mortises 3 and 8, and of which the section is also inscribed in a square having the same side dimensions as those of mortises 3 and 8. The squares corresponding to the tenons 12 and 13 are disposed and aligned on the surfaces 10 and 11 in the same way as those of base 2 and module 6. In the example shown, the tenons are straight cylindrical studs, but they could also be parallelepipedic. The mosaic of tenons 12 is the image of the mosaic of tenons 13 with respect to the longitudinal median plane of the element 9, as is clearly shown in FIG. 6.

The module 6 is placed in position on the base 2 as follows:

The module 6 is firstly joined, by its face 7, to the element 9, by its upper face 10, the tenons 12 cooperating with the mortises 8. Then the assembly obtained is placed, by the lower face 11 of the element 9, on the base 2, in the position shown at 14 in FIG. 1, the tenons 13 cooperating with the mortises 3.

If, for reasons of arrangement of the construction, the module 6 had in fact to be positioned in a position offset by a half-pitch parallel to one of the two edges 4 and 5 of the base 2, with respect to position 14, it would suffice to disengage from the base 2 the assembly constituted by the module 6 and its adaptation element 9, to rotate it through 180°, and to engage the tenons 13 in the mortises 3 again. This offset is made possible due to the fact that, with a length equal to an even number of half-pitches and a width equal to an odd number of half-pitches, there are, adjacent to two lateral edges 15 and 16 of the module 6, a given number (two) of mortises 8 and one mortise 8 less (one), respectively.

Figure 7:
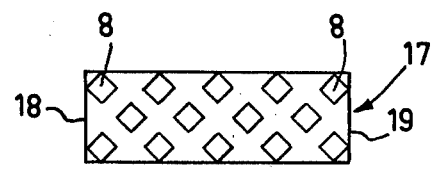
FIG. 7 shows a view from underneath of a second embodiment of a wall module of the construction set of the invention.

The module 17 shown in FIG. 7 is also a wall module, of the same width as module 6, but whose length is equal to an odd number of half-pitches. It is identical to module 6, except that, at its two edges 18 and 19, there is the same given number (two) of mortises 8.

Figure 8:
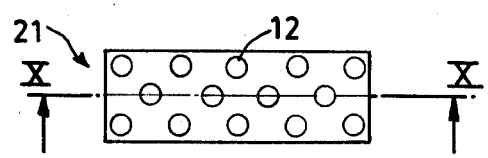
FIG. 8 shows a plan view of the adaptation element corresponding to the module of FIG. 7.
Figure 9:
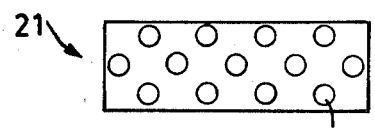
FIG. 9 shows a view from underneath of the adaptation element of FIG. 8.
Figure 10:
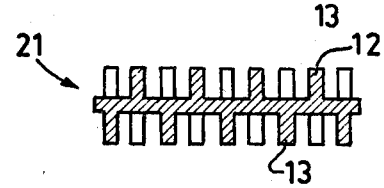
FIG. 10 shows a view in section along line X—X of FIG. 8.

To position the module 17 on the base 2, for example in the position shown at 20 in FIG. 1, an adaptation element 21 is provided, shown in FIGS. 8 and 9. This element 21, of the same length as the module 17, is identical to the element 9, except that the mosaic of tenons 12 is the image, with respect to the longitudinal median plane of the element 17, of the mosaic of tenons 13, but offset longitudinally by a half-pitch (FIG. 10). This element 21, with offset structures, is in fact necessary, as there is one mortise less on the base 2, opposite the edges 18 and 19 of the module 17, than on the edge of said module 17.

To offset the module 17 by a half-pitch with respect to the position 20, it is no longer sufficient to rotate it through 180° with its adaptation element 21.

In fact, in this offset position, opposite the edges 18 and 19 of the module 17, there are as many mortises 3 on the base 2 as there are mortises 8 on the edge of the module 17. The adaptation element 21 with offset structures must then be replaced by an adaptation element with non-offset structures, similar to the element 9, but of length equal to an odd number of half-pitches. Inversely, the element 21 must be taken to offset the module 17 by a half-pitch again.

Concerning the partition modules, whose width is equal to an even number of half-pitches, preferably two, they are similar to the wall modules.

However, there correspond to a partition module of length equal to an even number of half pitches, two adaptation elements with non-offset structures and with off-set structures respectively, whilst only one adaptation element, with non-offset structures, corresponds to a partition module of a length equal to an odd number of half-pitches.

With all the modules and elements described hereinabove available, the first module, for example the outer wall module, is firstly positioned on the floor, then the construction is continued, by positioning the second module either in line with or at right angles to the first, and so on. All the modules having a length equal to a whole number of half-pitches of the structure of the base, and each of these modules being able to occupy a given position or one of the four adjacent positions offset by a half-pitch parallel to the edges of the base indifferently, it will be readily appreciated that all sorts of houses and buildings may be constructed, without any difficulty, according to personalized plans.

Figure 11:
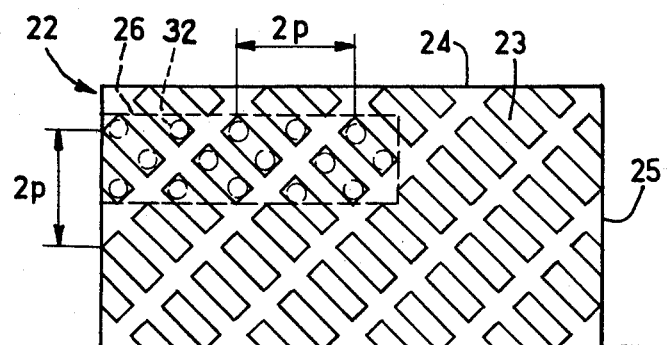
FIG. 11 shows a plan view of a second embodiment of the floor of the construction set according to the invention.

The set may comprise a variant embodiment 22 of the floor 1 of FIG. 1, shown in FIG. 11. The base 22 still comprises mortises 23, but they are no longer shaped as squares, but as rectangles.

These rectangles have a small side equal to the side of the mortises 3 and oriented at 45° with respect to the edges of the base 22, the large side being equal to triple the small side. The rectangles in question are distributed on the surface of the base 22 in four series of rectangles aligned parallel to the edges 24 and 25 of the base at a pitch equal to 2p, the rectangles of one of the four series of rectangles remaining offset with respect to those of an adjacent series by half the pitch p in the two directions parallel to the two edges of the base 22.

In fact, the invention is not limited to the two bases 1 and 22. Generally, in the construction set of the invention with a base 1, any base may be provided whose mortises, or tenons, have sections inscribed in rectangles distributed on the surface in 2n series of rectangles whose sides are respectively oriented at 45° with respect to the edges of the base, their small sides being equal to the sides of the squares 3 of the base 1 and their large sides to the sides of the squares 3 multiplied by (2n−1), the rectangles of one of the series being aligned at a pitch equal to np and being offset with respect to the rectangles of an adjacent series by p/2.

According to the position, shown at 26 in FIG. 11, of a wall module 6 and the position, shown at 32, of the lower tenons 13 of an adaptation element 9, it is readily noted that the same wall and partition modules may be positioned with the same adaptation elements described previously. In fact, base 1 is converted to base 22 by forming, for each group of two adjacent mortises 3 aligned at 45° with respect to the edges of the base, a supplementary mortise 3 between the two mortises in question, this not requiring other particular modules and adaptation elements.

The construction set according to the invention may also comprise wall and partition modules comprising on a plurality of their edges, or even on all four, a structure identical to that of the bases. The advantage obtained in particular by the structure formed on the upper edge of the modules lies in the possibility of positioning on these wall or partition modules, roof frame or eave modules also provided with the same structure or the complementary structure.

The wall or partition modules provided with mortises on their vertical edges may advantageously be joined by adaptation elements.

Figure 12:
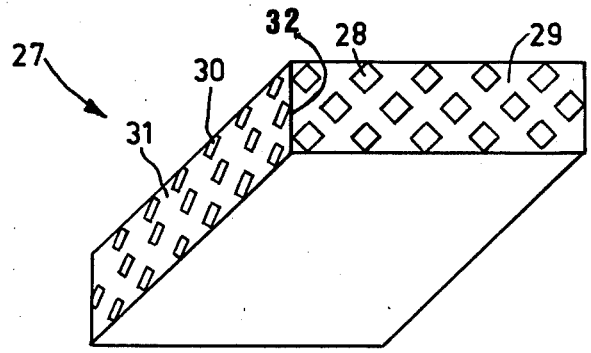
FIG. 12 shows a view in perspective of a third embodiment of a wall module of the construction set of the invention.

FIG. 12 shows a wall module 27 provided with mortises 28 on its upper edge 29 and mortises 30 on its vertical edges 31. For obvious constructional reasons, the structure of the mortises 30 extends, at right angles, to the structure of the mortises 28. Thus, at the solid angle of intersection 32 of the two edges 29 and 31, there are two mortises 28 on the edge 29 and one single mortise 30 on the edge 31, i.e. one less than on edge 29.

The construction set of the invention may further comprise modules (not shown) provided on their two faces perpendicular to their edges, with the same structure formed by mortises or by tenons. Such modules may thus ensure a function of support and fixation for other mobile elements, for example furniture elements or window, door, shutter modules, themselves provided with a structure complementary of that with which the faces of the wall and partition modules are provided.

Finally, the construction set of the invention may comprise elements, preferably adaptation elements, provided on one face with a given structure, for example formed by mortises, and on the other opposite face, with a complementary structure formed by tenons, further increasing the considerable versatility offered by the invention.

Figure 13:
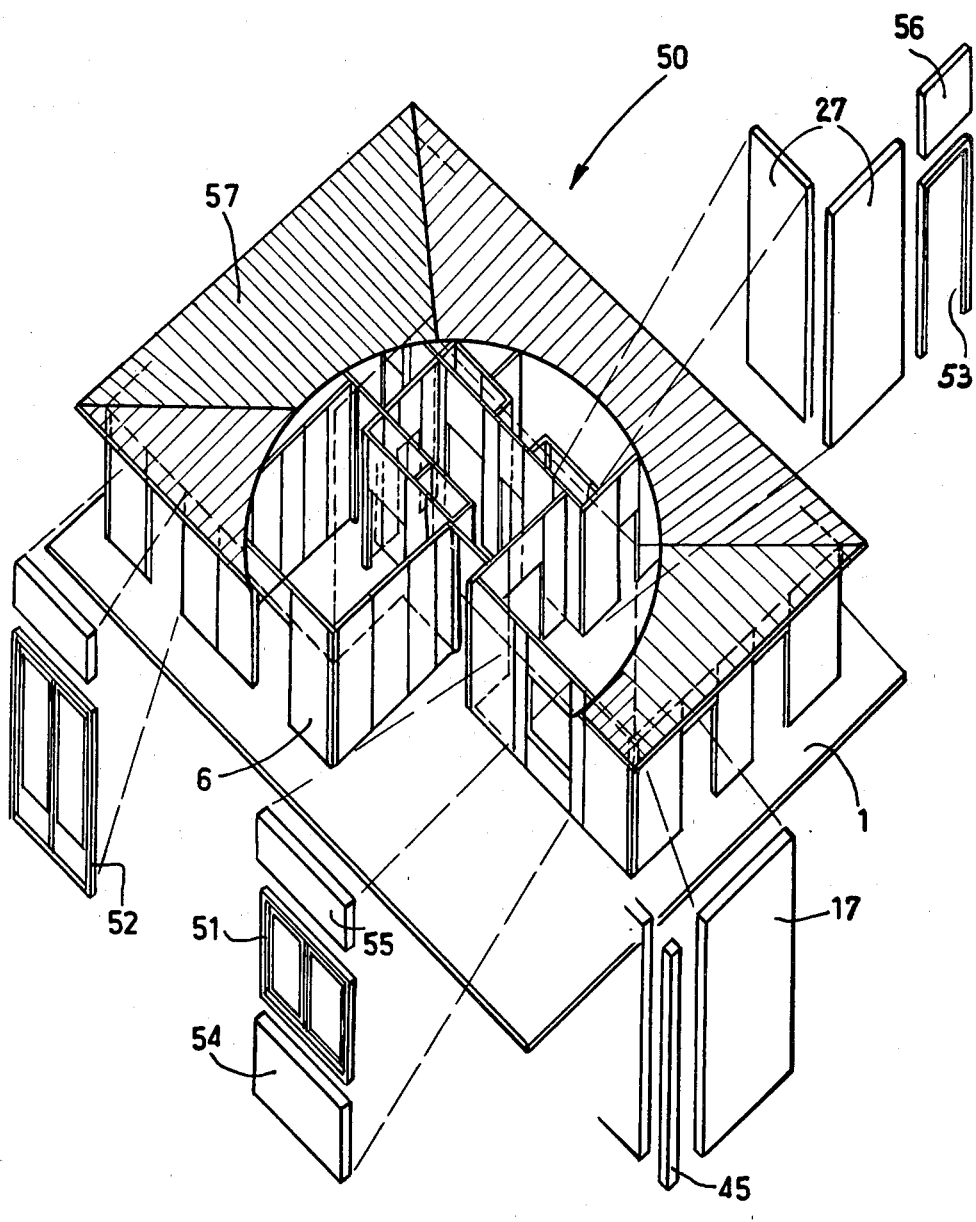
FIG. 13 shows an overall view in perspective, partly exploded, of a house constructed with the construction set according to the invention.

FIG. 13 schematically shows a house 50 comprising a certain number of rooms formed by wall and partition modules 6, 17 or 27 positioned on a floor 1.

It will be noted that the house further comprises window modules 51, French window modules 52, door frame modules 53, breast-wall modules 54, lintel modules 55 and 56, post modules 45 and a roof module 57, all these modules being positioned on the floor 1 with adaptation elements, in the manner described hereinabove, but not illustrated in this Figure.

What I claim is:

1. A construction set, particularly for constructing houses, comprising at least outer wall modules, inner partition modules, a rectangular floor, the floor comprising a mosaic jointing structure formed by identical mortises, or tenons, perpendicular to its surface, aligned in two perpendicular directions at regular, predetermined pitches and the transverse sections of which are parallel to its surface and inscribed in squares, each of said modules being formed by a rectangular panel of which at least one edge comprises a jointing structure identical to that of the floor, and adaptation elements comprising on two of their opposite parallel longitudinal faces a jointing structure complementary to that of the floor and of the modules, formed by tenons, or mortises, said squares of the sections of the mortises, or tenons, of the floor being distributed on the surface of the floor in two series of squares whose diagonals are respectively parallel to the edges of the floor and aligned at a pitch equal to double the length of these diagonals, the squares of one of the two series of squares being offset with respect to those of the other series by half said pitch in the two directions parallel to the edges of the floor.

2. The construction set as claimed in claim 1 wherein modules are provided whose width is equal to an odd number of halves of said pitch.

3. The construction set of claim 2, wherein adaptation elements are provided which are arranged so that each of their two jointing structures is the image of the other with respect to their longitudinal median plane.

4. The construction set of claim 1, wherein said adaptation elements have on one of their faces a jointing structure formed by mortises and, on the other of their faces, a complementary jointing structure formed by tenons.

5. The construction set as claimed in claim 1 wherein modules are provided of length equal to an even number of halves of said pitch.

6. The construction set as claimed in claim 1 wherein modules are provided whose width is equal to an even number of halves of said pitch.

7. The construction set as claimed in claim 1 wherein modules are provided of length equal to an odd number of halves of said pitch.

8. The construction set of claim 1, wherein said modules and adaptation elements are provided which are respectively of the same lengths.

9. The construction set of claim 1, wherein modules are provided, of width and length equal respectively to two even, or odd, numbers of halves of said pitch, as well as adaptation elements which are arranged so that each of their two jointing structures is the image of the other with respect to their longitudinal median plane, but offset longitudinally by half said pitch.

10. The construction set of claim 1, wherein modules are provided, on whose edges are disposed mortises or tenons.

11. The construction set of claim 1, wherein modules are provided of which a plurality of edges are provided with a jointing structure identical to that of the floor.

12. The construction set of claim 1, wherein modules are provided having edges and two faces perpendicular to said edges, which two faces have a jointing structure identical to that of the floor.

13. A construction set, particularly for constructing houses, comprising at least outer wall modules, inner partition modules, and a rectangular floor, each of said modules being formed by a rectangular panel at least one edge of which comprises a mosaic jointing structure formed by identical mortises, or tenons, perpendicular to said at least one edge aligned in two perpendicular directions at regular, predetermined pitches and the transverse sections of which are parallel to said edge and inscribed in squares, said squares of the sections of the mortises, or tenons, of the modules being distributed on the surface of the edge of said panel in two series of squares whose diagonals are respectively parallel to the surfaces of the panel and aligned at a pitch equal to double the length of these diagonals, the squares of one of the two series of squares being offset with respect to those of the other series by half said pitch in said two perpendicular directions, said floor being rectangular and comprising a mosiac jointing structure formed by identical mortises, or tenons, perpendicular to its surface and having transverse sections parallel to its surface which are inscribed in rectangles distributed on the surface of the floor in a given even number of series of rectangles whose sides are respectively oriented at 45° with respect to the edges of the floor, their small sides being equal to the sides of said squares and their large sides being equal to the sides of said squares multiplied by said number reduced by a unit, the rectangles of one of the series of rectangles being aligned, in the two directions parallel to the edges of the floor, at a pitch equal to said pitch multiplied by half said number, and being off-set with respect to the rectangles of an adjacent series by half said pitch in the two directions parallel to the edges of the floor, and adaptation elements comprising on two of their opposite parallel longitudinal faces a jointing structure complementary to that of the floor and of the modules, formed by tenons, or mortises.

14. The construction set of claim 1, wherein the jointing mortises are shaped as said squares and rectangles.

15. The construction set of claim 14, wherein the jointing tenons are straight cylindrical studs.

16. The construction set of claim 13, wherein modules are provided, of width and length equal respectively to two even, or odd, numbers of halves of said pitch, as well as adaptation elements which are arranged so that each of their two jointing structures is the image of the other with respect to their longitudinal median plane, but offset longitudinally by half said pitch.

17. The construction set as claimed in claim 13 wherein modules are provided having a length equal to an odd number of halves of said pitch.

18. The construction set as claimed in claim 13 wherein modules are provided whose width is equal to an odd number of halves of said pitch.

19. The construction set as claimed in claim 13 wherein modules are provided of length equal to an even number of halves of said pitch.

20. The construction set as claimed in claim 13 wherein modules are provided whose width is equal to an even number of halves of said pitch.

21. The construction set of claim 18, wherein adaptation elements are provided which are arranged so that each of their two jointing structures is the image of the other with respect to their longitudinal median plane.

* * * * *